(12) United States Patent
Branham et al.

(10) Patent No.: US 6,503,977 B1
(45) Date of Patent: Jan. 7, 2003

(54) SUBSTRATE COATINGS, METHODS FOR TREATING SUBSTRATES FOR INK JET PRINTING, AND ARTICLES PRODUCED THEREFROM

(75) Inventors: Kelly Dean Branham, Lawrenceville, GA (US); Alison Salyer Bagwell, Cumming, GA (US); Alice Susan Gordon, Roswell, GA (US); Leonard Eugene Zelazoski, Kennesaw, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/526,831

(22) Filed: Mar. 16, 2000

Related U.S. Application Data

(60) Provisional application No. 60/126,198, filed on Mar. 25, 1999.

(51) Int. Cl.[7] .............................................. C08L 39/00
(52) U.S. Cl. ........................................ 524/555; 524/556
(58) Field of Search ................................. 524/555, 556

(56) References Cited

U.S. PATENT DOCUMENTS

| | | | |
|---|---|---|---|
| 3,338,992 A | 8/1967 | Kinney .......................... 264/24 |
| 3,341,394 A | 9/1967 | Kinney .......................... 161/72 |
| 3,542,615 A | 11/1970 | Cary et al. .................... 156/181 |
| 3,692,618 A | 9/1972 | Dorschner et al. ............. 161/72 |
| 3,802,817 A | 4/1974 | Matsuki et al. ................ 425/66 |
| 3,849,241 A | 11/1974 | Butin et al. ................... 161/169 |
| 4,340,563 A | 7/1982 | Appel et al. .................. 264/518 |
| 4,732,786 A | 3/1988 | Patterson et al. ............. 427/261 |
| 5,075,153 A | 12/1991 | Malhotra ....................... 428/207 |
| 5,100,471 A | 3/1992 | Winnik et al. ................. 106/23 |
| 5,165,973 A | 11/1992 | Kojima et al. ................ 428/331 |
| 5,268,030 A | 12/1993 | Floyd et al. .................. 106/450 |
| 5,273,575 A | 12/1993 | Romain ....................... 106/23 B |
| 5,378,574 A | 1/1995 | Winnik et al. ................. 430/115 |
| 5,439,739 A | 8/1995 | Furukawa et al. ............. 428/341 |
| 5,496,634 A | 3/1996 | Ogawa et al. ................. 428/341 |
| 5,501,731 A | 3/1996 | Schmid et al. ............... 106/417 |
| 5,679,143 A | 10/1997 | Looman ...................... 106/20 R |
| 5,695,820 A | 12/1997 | Davis et al. ................. 427/261 |
| 5,751,325 A | 5/1998 | Leenders et al. .............. 347/96 |
| 5,755,870 A | 5/1998 | Ravishankar ................ 106/438 |
| 5,759,673 A | 6/1998 | Ikezawa et al. .............. 428/198 |
| 5,781,216 A | 7/1998 | Haruta et al. ................ 347/106 |
| 5,785,743 A | 7/1998 | Adamic et al. .............. 106/31.27 |
| 5,792,249 A | 8/1998 | Shirota et al. ............. 106/31.27 |
| 5,837,041 A | 11/1998 | Bean et al. ................. 106/31.6 |
| 5,853,861 A | 12/1998 | Held ........................... 428/207 |
| 5,854,307 A | 12/1998 | Kimura et al. ............... 523/161 |
| 5,897,694 A | 4/1999 | Woolf ......................... 106/31.27 |
| 5,925,176 A | 7/1999 | Rehman ...................... 106/31.43 |
| 5,935,310 A | 8/1999 | Engel et al. ................. 106/31.32 |
| RE36,303 E | 9/1999 | Ogawa et al. ................ 428/341 |
| 5,973,036 A | 10/1999 | Matzinger et al. ............ 524/31 |
| 6,001,904 A | 12/1999 | Matzinger et al. ............ 524/31 |
| 6,007,610 A | 12/1999 | Matzinger et al. ......... 106/14.05 |
| 6,020,405 A | 2/2000 | Matzinger et al. ............ 524/31 |
| 6,022,908 A | 2/2000 | Ma et al. .................... 523/160 |

FOREIGN PATENT DOCUMENTS

EP 0627324 A1 12/1994
WO 99/00541 1/1999

OTHER PUBLICATIONS

JP (Abstract), 11216948A, Aug. 10, 1999.
JP (Abstract), 10264506A, Oct. 6, 1998.
JP (Abstract), 10157278A, Jun. 16, 1998.
JP (Abstract), 10140059A, May 26, 1998.
JP (Abstract), 10138632A, May 26, 1998.
JP (Abstract), 10119425A, May 12, 1998.
JP (Abstract), 10114144A, May 6, 1998.
JP (Abstract), 10035090A, Feb. 10, 1998.
JP (Abstract), 10016381A, Jan. 20, 1998.
JP (Abstract), 9208853A, Aug. 12, 1997.
JP (Abstract), 9216917A, Aug. 19, 1997.
JP (Abstract), 9202038A, Aug. 5, 1997.
JP (Abstract), 9188978A, Jul. 22, 1997.
JP (Abstract), 9059550A, Mar. 4, 1997.
JP (Abstract), 7173420A, Jul. 11, 1995.
JP (Abstract), 8127979A, May 21, 1996.
JP (Abstract), 8025794A, Jan. 30, 1996.
JP (Abstract), 6340163A, Dec. 13, 1994.
JP (Abstract), 6340164A, Dec. 13, 1994.
JP (Abstract), 6234268A, Aug. 23, 1994.
JP (Abstract), 5179577A, Jul. 20, 1993.
JP (Abstract), 1075281A, Mar. 20, 1989.
JP (Abstract), 1020188A, Jan. 24, 1989.
JP (Abstract), 1011876A, Jan. 17, 1989.
JP (Abstract), 1009776A, Jan. 13, 1989.
JP (Abstract), 1009279A, Jan. 12, 1989.
JP (Abstract), 63183873A, Jul. 29, 1988.
JP (Abstract), 61074880A, Apr. 17, 1986.
JP (Abstract), 56157470A, Dec. 4, 1981.
NRL Report No. 4364, "Manufacture of Superfine Organic Fibers", V.A. Wente, E.L. Boone and C.D. Fluharty, May 25, 1954.
NRL Report No. 5265, "An Improved Device for the Formation of Superfine, Thermoplastic Fibers", K.D. Lawrence, R.T. Lucas and J.A. Young, Feb. 11, 1959.

*Primary Examiner*—Edward J. Cain
(74) *Attorney, Agent, or Firm*—James B. Robinson; Steven D. Flack (57) ABSTRACT

A wide array of textile fabric substrates can be treated to improve the colorfastness and washfastness of ink jet ink formulations. The aqueous treatment formulations include between about 5–95% cationic polymers or copolymers, and between about 5–20% fabric softeners. Additionally, the formulations may also include between about 0–80% of a polymeric latex binder so as to increase washfastness. These percentages are based on a conventional measurement for solids content.

14 Claims, 3 Drawing Sheets

SUBSTRATE COATINGS, METHODS FOR TREATING SUBSTRATES FOR INK JET PRINTING, AND ARTICLES PRODUCED THEREFROM

This application claims benefit of provisional appln No. 60/126,198 filed Mar. 25, 1999.

FIELD OF THE INVENTION

The present invention relates to substrate coatings and treated ink jet printable textile fabric substrates which are intended to receive images when printed by ink jet printing devices. In particular, the present invention relates to methods of construction or fabrication of an ink jet printable textile substrate which facilitates the use of such substrate in commonly available ink jet or laser printing devices, such as wide or narrow format ink jet and laser printers.

BACKGROUND OF THE INVENTION

Ink jet printing is a non-impact and non-contact printing method in which an electronic signal controls and directs droplets or a stream of ink that can be deposited on a wide variety of substrates. Current ink jet printing technology involves forcing the ink drops through small nozzles by piezoelectric pressure, thermal ejection, or oscillation, and onto the surface of a material/media. Ink jet printing is extremely versatile in terms of the variety of substrates that can be treated, as well as the print quality and the speed of operation that can be achieved. In addition, ink jet printing is digitally controllable. For these reasons, ink jet methodology has been widely adopted for industrial marking and labeling. In addition, ink jet printing methodology has also found widespread use in architectural and engineering design applications, medical imaging, office printing (of both text and graphics), geographical imaging systems (e.g., for seismic data analysis and mapping), signage, in display graphics (e.g., photographic reproduction, business and courtroom graphics, graphic arts), and the like. Finally, ink jet printing has now also been used to create an image on a variety of textile substrates.

The use of ink-jet printing to create an image on textile fabrics has allowed for the rapid visualization of an aesthetic design on fabric without the use of expensive and often wasteful screen printing techniques. Such ink-jet printing methodology allows a designer, design house, or production facility to visualize a finished design in significantly less time than is usually necessary to burn a screen image of the design by typical screen printing methodology.

Both dyes and pigments have been used as colorants for such ink jet ink formulations. However, such materials do not always bind well to substrates to which the ink is applied. For example, dyes may dissolve upon a substrate's contact with water. Thus images applied employing ink jet methodology may tend to run or smear upon repeated contact, or may be actually removed from the printed surface if exposed to substantial quantities of aqueous media (e.g., if an ink jet printed article is laundered). Moreover, images applied employing ink jet methodology may also tend to fade or wash out upon prolonged exposure to visible, ultraviolet and/or infrared light. Furthermore, dyes applied to textile substrates may experience severe dye bleed upon application to the substrate. Finally, the color intensity of the image printed on a textile substrate using ink-jet methodology is often lacking in vibrancy.

The nature of textile substrates also pose specific problems when printing or imaging via ink jet print methods, which are not found with common ink jet substrates (e.g. paper or coated paper). For instance, textile substrates are often composed of woven or nonwoven materials. If the textile substrates are composed of nonwoven materials, they can be made from spunbond or meltblown polymeric materials, for example.

As used herein the term "meltblown" means fibers formed by extruding a molten thermoplastic material through a plurality of fine, usually circular die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, in various patents and publications, including NRL Report 4364, "Manufacture of Super-Fine Organic Fibers" by B. A. Wendt, E. L. Boone and D. D. Fluharty; NRL Report 5265, "An Improved Device For The Formation of Super-Fine Thermoplastic Fibers" by K. D. Lawrence, R. T. Lukas, J. A. Young; and U.S. Pat. No. 3,849,241, issued Nov. 19, 1974, to Butin, et al.

As used herein the term "spunbond" refers to small diameter fibers which are formed by extruding molten thermoplastic material as filaments from a plurality of fine, usually circular capillaries of a spinneret with the diameter of the extruded filaments being rapidly reduced as by for example in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,542,615 to Dobo et al.

Furthermore, other nonwoven processes such as, for example, hydroentangling, air-laid and bonded-carded web processes, may be used to manufacture nonwoven materials for use in textile fabrics. Such materials would normally be hydrophobic in nature, and therefore pose adherence challenges for aqueous based inks. Aqueous inks would tend to wet these materials poorly, thus leading to wicking, bleeding and other problematic print defects.

If the textile substrates are composed of woven materials, the woven or knit threads or strands are formed of fibers. The textile fibers can vary widely in composition, with each composition presenting a unique set of conditions for acceptable printing of the substrate. For example, substrates made of cotton fibers may be very absorbent, such as in the case of aqueous-based inks. When ink is ejected from the ink channel of an ink jet printing device, it is rapidly absorbed into the fibers of the cotton substrate. Since these fibers are much larger that the fibers typically found in paper substrates, the color density or appearance of color brightness is significantly diminished due to the lack of retention of the colorant at the surface of the fibers. In addition, bleeding, mottle of the print pattern, and loss of image sharpness or clarity can often result from printing on the woven textile fabric itself.

Conversely, woven synthetic fibers such as polyester or nylon may be poorly wet by aqueous inks, and such inks may be only retained in the interstitial spaces between the fibers. This limited ink retention also causes the print-quality related problems outlined above.

Furthermore, the permanence of the printed image on textile fabrics is often achieved commercially by some post-printing curing process such as heating, steaming, or chemical fixation. These processes tend to be inefficient, requiring further washing and drying steps to remove unfixed colorant from the fabric. It is therefore desirable to enhance the permanence of the printed image on ink jet printable substrates, and in particular textile substrates, either in the presence or absence of a post-printing curing process step.

Polymeric materials are typically used commercially to modify the properties of both natural and synthetic textile fibers and substrates. These treatments may alter textile appearance or hand, reduce shrinking, reduce flammability, or alter other properties of the fiber or substrate. Treatments may even be employed to enhance the ease of printing and/or print performance when commercial printing processes, such as rotary screen printing, are employed. For instance, polyethylene oxide has been used to pretreat a starting cloth material so as to create an adequate textile substrate for ink-jet printing. As disclosed in U.S. Pat. No. 5,781,216 to Haruta et al., the use of polyethylene oxide treated textile substrates are described as being highly capable of providing images of great color depth with sufficient brightness and sharpness, but free of objectionable color bleed. While Haruta discloses such a polyethylene oxide pretreatment with a cationizing agent, to thereby enhance the coloring ability of images, Haruta requires such treatment to thereafter be cured by additional heating, washing and drying steps.

Use of cationic polymers as part of a latex saturant in a hydroentangled fibrous web is disclosed in PCT US 98 12712 to Harris et al., which was published as WO99/00541 on Jan. 7, 1999. As described in WO99/00541, latex saturation is typically followed by a drying step or other curing aids.

The construction or fabrication of ink jet printable substrates, and in particular, ink jet printable textile substrates which allow for colorfastness and washfastness of ink jet inks without the need for an additional curing or post-treatment step, and which can be easily used in commonly available ink jet or laser printing devices, has proven elusive. Furthermore, feed or holding mechanisms for such ink jet printer devices require a rigid substrate which may be advanced under or across the printing head or drum. Most textile substrates lack the dimensional stability to feed, advance, or otherwise function adequately through such mechanisms and often end up contacting or interfering with the printer heads or drums.

Accordingly, there is still a need in the art for coating formulations and ink jet printable substrate treatment methods which provide for high optical density with a minimum amount of bleeding on the substrate during and after imaging from ink jet printers. There is also a need in the art for such ink jet printable substrate treatment methods which can be applied to textile fabric substrates. In this regard, there is still a need in the art for methods for treating textile fabrics for receiving ink-jet ink formulations, which methods allow for improved colorfastness and color intensity in a wide variety of textile substrates. Furthermore, there is still a need in the art for such substrates which are not dependent upon an ink curing step for construction. Finally, there is also a need in the art for such a textile substrate which includes a backing that can be easily coursed through an ink jet printer and which releases easily from the backing.

SUMMARY OF THE INVENTION

The needs described above are addressed by the present invention, which provides a method to modify the adhesion properties and/or colorfastness of ink jet ink formulations when applied to a variety of ink jet printable substrates, by treating the substrates with coating formulations. In particular, a wide array of textile fabric substrates can be treated to improve the colorfastness and washfastness of ink jet ink formulations. The aqueous treatment formulations include between about 5–95% cationic polymers or copolymers, and between about 5–20% fabric softeners. Additionally, the formulations may also include between about 0–80% of a polymeric latex binder so as to increase washfastness. These percentages are based on a conventional measurement for solids content, that is the weight of the dissolved or dispersed solids divided by the total weight of the formulation. Total solids content for the formulations typically range from about 10–50%, but preferably range from about 12–25%. The present methods provides a pathway to fixation of dyes, irrespective of chemical ink class or textile fabric substrate, and without the need of any further ink curing process, by conventional drying under ambient conditions. In addition, efficacy of post printing processes such as steaming or curing may be enhanced by such formulations, reducing dye waste and further enhancing color vibrancy. Also, fixation of pigment or colorant may be enhanced by these formulations.

Additionally, a backing may be applied to such treated textile substrates which enables the substrates to be readily coursed through ink jet printers and still be easily removed for further use, sampling and/or experimentation.

These and other features and advantages of the present invention will become apparent after a review of the following detailed description of the disclosed embodiments and the appended claims.

DETAILED DESCRIPTION OF THE INVENTION

Generally speaking, the present invention relates to coating formulations and methods to improve the adhesion properties and/or colorfastness/color density and washfastness of ink jet printable substrates in the absence of a post treatment curing step such as heating, radiation or chemical treatment. According to the invention, a textile substrate may be treated with an aqueous formulation including cationic polymers or copolymers and fabric softeners. Desirably, the method comprises treating a textile substrate with a formulation including between about 5–95% cationic polymers or copolymers, and between about 5–20% fabric softeners. All percentages are % total solids unless otherwise stated.

The present invention is further directed to a treated ink jet printable substrate wherein the treatment comprises a formulation of cationic polymers or copolymers and fabric softeners. Desirably, the present invention is a treated ink jet printable substrate wherein the treatment comprises between about 5–95% cationic polymers or copolymers, and between about 5–20% fabric softeners.

The cationic copolymers function in the formulation to attract and fix dye molecules having anionic moieties to the substrates, and in particular, textile fabric substrates. The polymers or copolymers may contain reactive residues or groups capable of crosslinking to the textile fibers, with themselves, or with other components present in the formulation. Such cationic resins may incorporate charge groups in the main polymer chains or polymer backbones, or as side groups in the polymer chains. Desirably, such cationic polymers are quaternary ammonium polymers. An exemplary list of structural formulas of such cationic polymers follows.

Structural Formulas of Exemplary Cationic Polymers a)

b)

c)

d)

e)

Where
A, B = O, NH, N——

$R_1$, $R_2$=quaternary ammonium, hydrophilic, hydrophobic, reactive, or self condensing group
$R_3$=H, alkyl, or alkoxy group
X=halogen or other counter ion f)

Where
a=1 to 99%, b=(100−a)%, c=0 to 100−(a+b)% for all of the above.
R1, R2—as above g)

Where
a=1 to 99%, b=(100−a)% for CP 7091 RV, a∼90; b∼10

These cationic polymers may include but are not limited to polymers and copolymers of diallyldialkyammonium monomers, such as diallyldimethylammonium chloride, cationic acrylate and acrylamide such as acryloxyethyldimethylammonium chloride or acrylamidoethyldimethylammonium chloride monomers, quaternized vinylpyridine such as methyl vinylpyridine chloride, and polyalkylamine polymers and copolymers. Co-monomers in such systems may consist of ones which modify the flexibility, hydrophobicity, or mechanical properties of the polymer molecule. In addition, reactive and/or self-condensing monomers may be included to enhance adhesion to the textile fiber or other components in the formulation. Other examples of cationic polymers with charged groups in the main chain include epihalohydrinamine polymers such as Reten™ 204 LS and Kymene™ 557 LX polymers of Hercules Incorporated, of Wilmington, Del. A specific example of a desirable cationic polymer resin is CP 7091 RV available from ECC International of Roswell, Ga., with CP 7091 RV being a poly(diallyldimethylammonium chloride-co-diacetone acrylamide).

Suitable fabric softeners include for example, Varisoft 222 of the Witco Corporation of Greenwich, Conn., Adogen 432 also of the Witco Corporation, Accosoft 550-75 of the Stepan Company of Northfield, Ill., Alubrasoft Super 100 and Alubrasoft 116 of the BASF Corporation, Specialty Chemicals Division of Mt. Olive, N.J., and Ahcovel Base N-62 of ICI Surfactants or Hodgson Textiles Chemical of Mt. Holly, N.C. Suitable fabric softeners include those that are cationic or nonionic and provide the attributes of print quality and image brightness to the printed textile substrate. A class of such fabric softeners are alkylated ammonium compounds. The fabric softener most suitable to a particular textile fabric substrate varies by fabric substrate. For instance, it has been found that the fabric softener Varisoft 222 performs better with cotton fabric samples while Adogen 432 performs better with nylon/lycra samples. As previously indicated, the formulation is aqueous, with water serving as a carrier.

In another embodiment of the present invention, treatments or formulations for ink jet printable substrates, and in particular textile substrates, may also include a latex binder in order to further enhance the adhesion and/or waterfastness of colorants on the textile fabric substrates. It has been found that coated ink jet receptive substrates including a latex binder provide high color density and saturation relative to untreated textiles, superior print quality relative to untreated textiles, reduction of wicking or bleeding relative to untreated textiles, and enhanced ink absorption relative to untreated textiles. Furthermore, the coating or treatment formulations provide a waterfast printed image when printing via an ink jet printing process, without the necessity of post-printing curing steps such as heating, steaming, chemical fixation, or radiation. The latex reinforcing polymers may be either nonionic or cationic. By way of example only, the latex materials may include vinylacetate, ethylene-vinylacetate, acrylate, styrene, and styrene-acrylate resins and other cationic or nonionic latexes. These resins may include reactive or self cross-linking groups in addition to inherent cationic functionality. The treatment formulation with a binder desirably includes between about 5–95% cationic polymers or copolymers, between about 5–20% fabric softeners and between about 0–80% latex binder.

Likewise, the present invention is also directed to a treated ink jet printable substrate wherein the treatment includes a formulation of cationic polymers or copolymers, fabric softeners, and a latex binder. A desirable embodiment of the present invention is a treated ink jet printable substrate wherein the treatment formulation includes between about 5–95% cationic polymers or copolymers, between about 5–20% fabric softeners and between about 0–80% latex binder.

The aqueous treatment formulations may also include other additives which affect the appearance or tactile properties of the finished substrate, such as optical brighteners. Other additives include mineral particles such as silicas, clays, calcium carbonate, and titanium dioxide for ink absorption, permanence of color, and image quality.

It should be recognized that all of the stated percentages are based on total solids. These percentages are based on conventional measurements of solids content, that is the weight of the dissolved or dispersed solids divided by the total weight of the formulation. Such measurements may be taken via a Sartorius Model MA30 of the Sartorius Corporation of Edgewood, N.Y., following the operating procedures provided by the manufacturer. Total solids content for the formulations typically range from between about 5–50%, but desirably range from between about 5–32%. More desirably, the total solids content for the formulations range from between about 25–28%.

The treatment formulations for the textile substrates may be made by adding the above components from aqueous stock solutions or dispersions, as described in the examples, or as solids when appropriate, and mixing to homogeneity. In the case where such components are mixed as solids, they would then be added to water to achieve the desired total solids percentage.

Application of the treatment formulation to the textile substrates may be carried out by any known means to those having ordinary skill in the art. For instance, fabric substrates may be treated by a standard padding (dip and squeeze) method and dried in a forced air oven, although any suitable drying means of textiles known to those skilled in the art may be employed. For instance, other drying methods include drying over steam cans, via infrared radiation and using microwave drying.

Figure 1:
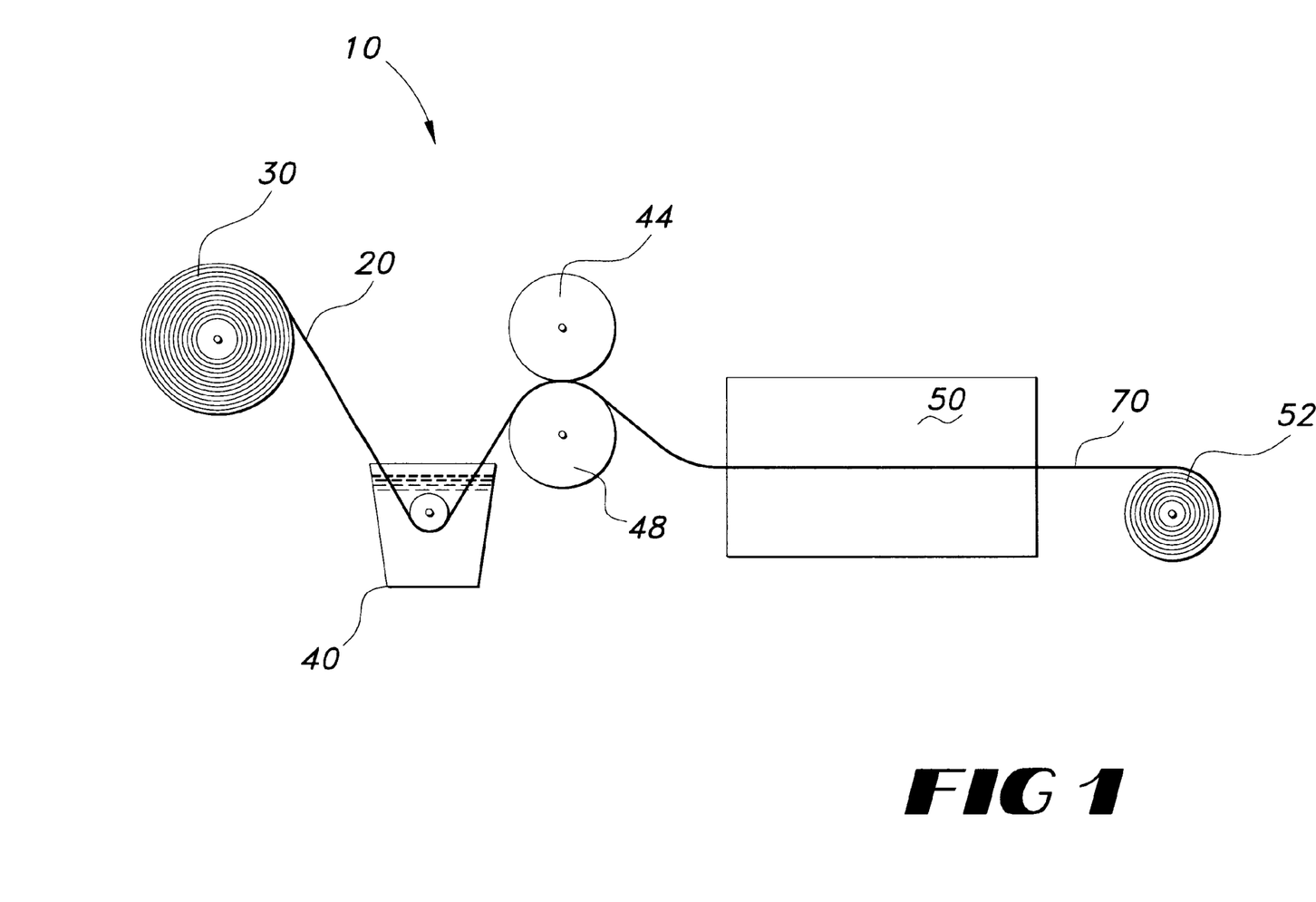
FIG. 1 illustrates a schematic view of an exemplary dip and squeeze (padding) process for treating ink jet printable substrates.

As can be seen in FIG. 1 showing a schematic view of a desirable dip and squeeze (padding) process 10 for treating ink jet printable substrates, a textile substrate 20 is unwound from the incoming roll 30 and is then dipped in a saturator tank/bath 40 for sufficient time for it to become saturated (thoroughly impregnated) with the treating formulation. This time would vary by the type of substrate. The dip time desirably ranges from between about 1 to 2 seconds. The textile substrate is then run through a pressurized nip roll set 44 and 48. The pressure on the rolls should be in the range of between about 10–120 psig but desirably between about 10–65 psig, depending on the type of textile fabric substrate utilized, and the total solids content of the treatment formulations used. The pressurized nip rolls squeeze the coating evenly onto the substrate so as to penetrate the surface of the substrate. The rolls may be either rubber or steel, however a set of rolls in which at least one roll is rubber is desirable. Following passage through the nip pressure rolls, the textile substrate is coursed through a drying means 50 such as a forced air oven. The drying means may include a tenter frame for holding the textile substrate, and may itself encompass multiple consecutive drying means depending on the nature of the substrate to be dried. The drying temperature is preferably in the range from between about 225° F. to 325° F. Desirably, the temperature should be between 240 and 270° F. The typical time for drying is between about 30 seconds and 2 minutes, but desirably about 1 minute. Following drying, the finished treated textile substrate 70 is taken up on a wind up roll 52. The textile substrate may be rolled up for storage or moved to a lamination process in preparation for ink jet printing.

Using this application method, dry pick-up ratios of the textile substrate may vary from between about 0.5% to about 50%. Desirably, the dry pick-up ratios may vary from between about 3 to about 20%. More desirably, the dry pick-up ratios may vary from between about 6 to about 15%. Wet pickup ratios for the textile substrates are typically between about 30–150%. Desirably, such wet pick-up ratios are between about 80–120%. Desirably for Dacron banners, the wet pick up ratios are between about 40–120%.

The percent dry pickup was calculated in accordance with the following series of conventional equations. These equations are described in Wellington Sears Handbook of Industrial Textiles, by Sabit Adanur, Ph.D., copyright 1995, p 179.

$$\text{Wet pickup (\%)} = \frac{\text{Weight of formulation picked up}}{\text{Weight of dry fabric}} \times 100$$

From this the following equation was utilized to arrive at the values in the charts for % dry-pickup.

% Dry Pickup=((Wet/Basis Weight)×100)−100×% Solids (TS)

Substrates which may be treated in accordance with the present inventive methods are varied, and include paper, fabric, films, and the like, although textile fabric substrates are preferred. Such textile fabrics may include but are not limited to cotton, silk, wool, polyester, rayon, nylon, and blends thereof, as well as nonwoven materials. Furthermore, the disclosed ink jet substrates may provide the benefits disclosed herein with or without further post-printing curing steps involving the use of heat i.e. dry, steam, radiation or pressure. Ideally such treated substrates provide adhesion and/or colorfastness of the colorant with only ambient or room temperature curing or drying of the printed image. It should be noted however, that while not being necessary for the process, a post printing curing step may further enhance the colorfastness and washfastness of the printed image on the substrate. The basis weight of the various textile fabric materials which may be treated by these formulations is desirably from about 2 ounces per square yard (osy) to about 9 osy.

Dye classes which may be used in ink jet printers to be printed on such treated substrates include acid dyes, reactive dyes, direct dyes, azoic dyes, sulfur dyes, modified dyes, polymeric dyes, copolymerized dyes or other classes of colorants known to those skilled in the art. Furthermore, pigment colorants may be used in the ink jet printers to be printed on such substrates. It has also been found that when such substrate is printed with ink jet inks containing additives such as a chelate of a transition metal or a chelate of a mixture of transition metals, such as those described in U.S. Pat. No. 5,897,694 to Woolf and U.S. application bearing Ser. No. 09/109,681 filed Jul. 2, 1998, incorporated herein by reference in their entirety, the effect of such substrate treatments may be further enhanced so as to provide enhanced colorfastness and washfastness.

In yet another embodiment of the present invention, the above described treatment formulations may be used in a method to treat sign and banner textile fabric substrates. Such substrate materials include 100% cotton, 100% polyester, 100% silk, nylon, rayon and blended materials, such as blends of cotton and polyester, as well as nonwoven, as further described in the examples which follow. For instance, it has been found that the pretreatment of banner textile fabric substrate with an aqueous formulation including cationic polymers, fabric softeners, and optional latex polymer binders in accordance with the previously described methods enable the banner substrates to be ink jet ink printable with improved colorfastness/ color density and washfastness, with reduced color bleed. Likewise, the present invention is also directed to a treated ink jet printable banner substrate wherein the treatment comprises an aqueous formulation of cationic polymers or copolymers, fabric softeners, and an optional latex binder. Desirably the treated ink jet printable banner substrate includes a treatment of between about 5–95% cationic polymers or copolymers, between about 5–20% fabric softeners and between about 0–80% latex binder.

Still another embodiment of the present invention relates to a method of construction or fabrication, and a construction of an ink jet printable textile substrate laminate with backing material, which facilitates the use of such substrate in commonly available ink jet or laser printing devices, such as wide or narrow format ink jet and laser printers. Feed or holding mechanisms for such printing devices require a rigid substrate which may be advanced under or across the printing head or drum. Most textile substrates lack the dimensional stability to feed, advance, or otherwise function adequately through such mechanisms. Furthermore, use of the commonly available waxy craft paper as backing material in a textile laminate, does not allow for absorbance of any inks as they are printed onto the textile substrate. Rather the inks pass through the substrate to the wax paper backing and as a result, transfer onto the back portion of the textile substrate which is in contact with the backing material sheet.

A method for constructing an ink jet printable textile substrate laminate, with improved colorfastness and washfastness is now provided which utilizes a paper carrier/ backing sheet on a treated textile substrate of the type previously described, to insure its performance in ink jet or laser printing devices.

The method comprises treating a textile substrate with a formulation including between about 5–95% cationic polymers or copolymers, and between about 5–20% fabric softeners, and optionally between about 0–80% latex binder, and laminating the textile substrate to a paper carrier which has been coated with an adhesive, the paper carrier being impregnated with latex. Once the paper backed treated textile laminate has been constructed, it can then easily be coursed through an ink jet printer.

Alternatively, the method comprises treating a textile substrate with a formulation including about 5–95% cationic polymers or copolymers, and about 5–20% fabric softeners, laminating the textile substrate to a paper carrier which has been coated with an adhesive, the paper carrier being impregnated with latex and the adhesive being capable of releasing from said treated textile substrate without leaving an adhesive residue or transferring portions of the paper carrier to the textile substrate.

In still a further alternate embodiment, the method comprises treating a textile substrate with a formulation including between about 5–95% cationic polymers or copolymers, between about 5–20% fabric softeners, and between about 0–80% latex binder, laminating the textile substrate to a paper carrier which has been coated with an adhesive, the paper carrier being impregnated with latex and the adhesive being capable of releasing from said treated textile substrate without leaving an adhesive residue or transferring portions of the paper carrier to the textile substrate.

The nature of the printable substrate has previously been characterized. The nature of the paper backing material/ carrier may be characterized as desirably a cellulose base sheet containing softwood kraft pulp which may be saturated with a soft acrylic latex to improve dimensional stability and which subsequently, may be coated with an adhesive of choice. Preferably the backing sheet or carrier paper will be capable of absorbing some of the excess ink from the ink jet printing process as the image is printed onto the textile substrate, and includes a release coat. Such carrier/backing papers are available through the Kimberly-Clark Corporation of Roswell, Ga. under the Grade Codes 0140 PO and 5128 PO. Such papers can be characterized by predictable properties including dimensional stability, ink or solvent absorption, and flexibility of the paper backing before, during, and after printing.

The carrier paper is desirably coated with an adhesive which allows for easy uniform application to the substrate, as well as easy release from the substrate after printing. The adhesive may be characterized by its ability to hold the substrate to the backing material such that the entire laminate feeds or interacts smoothly with the feed or holding mechanism of the printing device. Furthermore, it is another characteristic of such adhesives or compounds to facilitate the ease of removal of the backing material without transfer of adhesive and/or backing material to the printed textile substrate. These adhesive materials may include compositions of latex or rubber in a pressure sensitive adhesive system, and after attachment to the paper carrier desirably possess peel strength values of between about 5–25 g/in as measured by the method which follows. Such adhesive coated papers are available through American Biltrite, Inc. of Moorestown, New Jersey under the designation ProtecRite® 6798 and ProtecRite® 6582. Adhesive coated backing papers identified by the designation 6798 include a paper having a nominal thickness of 5.4 ml, an initial adhesion value of 27 oz/in, a tensile strength of 16 lbs/in, and an elongation capability of 10%. Adhesive coated backing papers identified by the designation 6582 include a paper nominal thickness of 5.2 ml, an initial adhesion to steel value of 16 oz/in, a tensile strength of 18 lbs/in, and an elongation capability of 12.5%.

Figure 2:
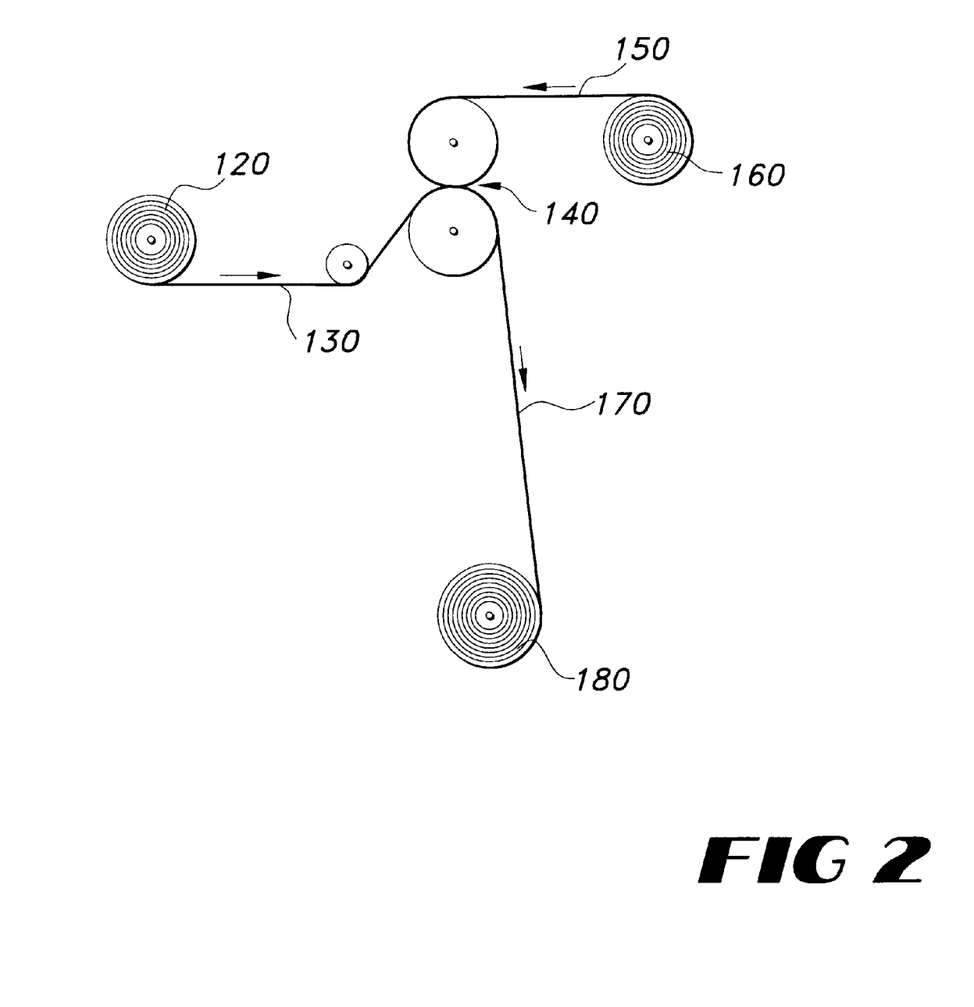
FIG. 2 illustrates a schematic view of a lamination process for laminating a backing to an ink jet printable substrate, which substrate has been treated in accordance with the process illustrated in FIG. 1.

Lamination of a variety of fabrics to these adhesive coated papers can be done with a rubber to rubber, or rubber to steel roll nip, with or without heat, and the capability of varying nip pressures and line speed to assure adequate laminated adhesion of the two substrate layers. Lines speeds may run between 3 and 50 yards per minute, desirably between 5 ypm and 20. As illustrated in FIG. 2, a lamination process for laminating a backing to an ink jet printable substrate may be accomplished by drawing the treated textile fabric substrate 70 from a feed roll 120 and passing it through nip 140. The adhesive backed paper 95 is unwound from feed roll 160 and subsequently fed to the fabric at the nip. The two layers are joined together under pressure and optionally heat in the nip 140 (such as steam to heat one of the rolls in the laminating nip) where bonding takes place between the textile substrate and the adhesive coated paper. The lamination rolls may be heated steel rolls, or in the alternative, a rubber roll may be used without heat. Desirably, the pressure between the lamination rolls is between about 15 and 120 psig, more desirably between about 20 and 120 psig. If steam is used to heat one of the rolls, it is desirable that steam pressure be between about 0 (for room temperature) to 65 psig. The heating temperature of the rolls if desired may run between about room temperature to 210° F. This would change by fabric type and construction, as well as coating composition. Following lamination, the paper-backed textile substrate 170 is wound up on storage roll 180, or in the alternative, trimmed and packaged.

Figure 3:
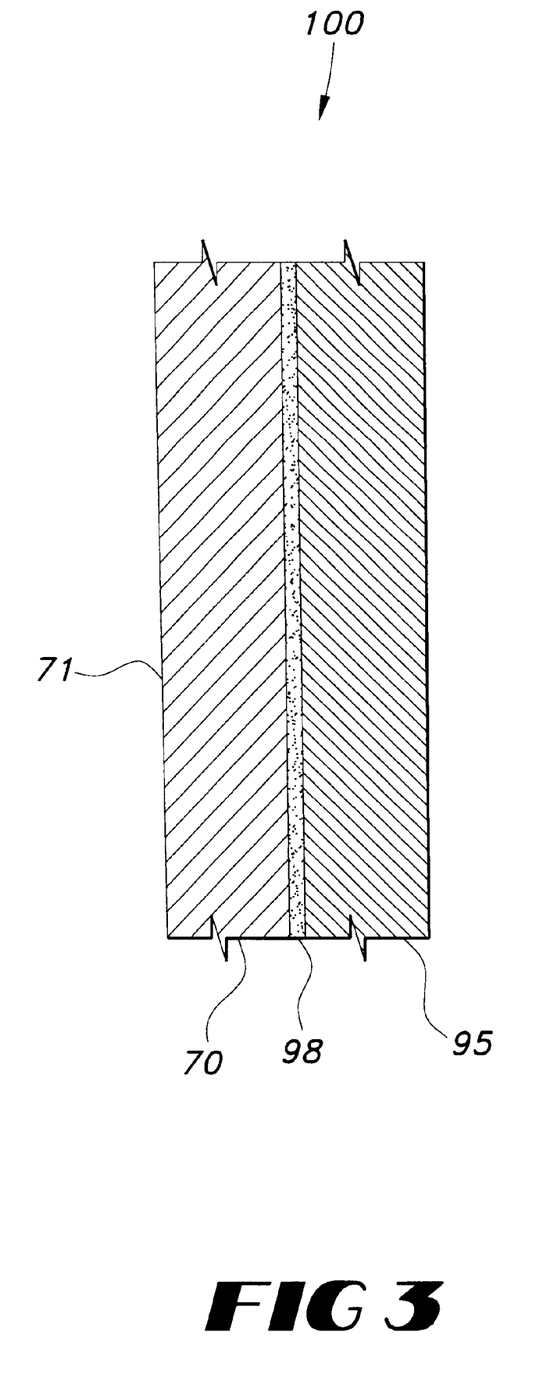
FIG. 3 illustrates a cross section of a laminate of the present invention produced in accordance with the lamination process illustrated in FIG. 2.

The final laminate 100, which is illustrated in cross section in FIG. 3, includes the textile substrate 70 with surface to be printed 71, and with adhesive 98 coated backing layer attached thereto 95. In this fashion, a laminate which can then be coursed through an ink jet printer and which is capable of receiving an ink jet image on one side 71, has been created.

In accordance with yet another embodiment of the present invention, there are provided consumer articles produced by the above described methods, employing treated textile substrates as described herein. Such articles may include for example advertising signs, signage banners, wall coverings, and other home furnishing products. Thus according to the present invention, ink jet printed images applied to a treated substrate as described herein resist removal, even upon repeated contact of the printed substrate with water. Such repetitive contact can be the result of normal handling of an article, accidental exposure to liquid, and routine laundering of the article. When articles according to the present invention comprise a treated substrate containing an ink jet image printed thereon, the resulting image adheres sufficiently to said substrate to resist removal therefrom upon washing of said article.

The present invention is further described by the examples which follow. Such examples however, are not to be construed as limiting in any way either the spirit or the scope of the present invention.

EXAMPLES

Example A

Textile substrate samples were first prepared in accordance with the previously described methods, and printed with a test pattern using a commercial ink jet printer utilizing commercial ink jet inks containing acid, reactive, and/or direct dyes. Color density, color bleed, and print quality were evaluated on the samples as printed. These textiles included cotton poplin textile substrates. Duplicates of both sets of samples were washed using a washing method as described in Example B. Color density, color bleed, print quality or appearance, and color permanence were evaluated using the washed samples. Data from Example A is expressed in Table 1 which follows.

TABLE 1

| INK | INK ADDITIVE | FABRIC TREATMENT | HEAT TREATMENT | COLORFAST EVAL. WATER -DELTA E | DETERG. DELTA E |
|---|---|---|---|---|---|
| Encad GA | None | None | None | <56 | <82 |
| Encad GA | None | 0.5% CP 7091 RV | None | <29 | <66 |
| Encad GA | None | 1.0% CP 7091 RV | None | <28 | <50 |
| Encad GA | None | 2.0% CP 7091 RV | None | <27 | <32 |

For the purposes of Example A above, CP 7091 RV is a diallyldimethylammonium chloride/diacetone acrylamide copolymer, of ECC International. Encad GA inks employ standard monomeric dyes. The sampling tested magenta inks. Samples were hand washed. Delta E was calculated in the samples utilizing the spectrodensitometer and equation described below for Example B. The sampling, was produced using a dip and squeeze method, as previously described, and was laminated by using a pressure roll nip. The coating formulation in Example A only included cationic polymer in the aqueous formulation. The resulting coated samples proved stiff to the touch.

A more rigorous set of tests were then run in Example B on a variety of fabric substrates, with expanded coating formulations. These textile fabric substrates include the materials listed in the following Table 2.

TABLE 2

| FABRIC | STYLE | CONSTRUCTION | SOURCE | BASIS WEIGHT (OZ/YD$^2$) | BASIS WEIGHT SI UNITS (G/M$^2$) |
|---|---|---|---|---|---|
| Polyester poplin | PP 6248 | Plain Weave | Fisher Textiles | 3.8 | 128.8 |
| Polyester satin | PS241 | Satin | Fisher Textiles | 4.1 | 139.0 |
| 250 Denier Dacron Poly. | 250 Dacron | Plain Weave | Fisher Textiles | 3.2 | 108.5 |
| Cotton Poplin | 9680 | Plain Weave | Lorber Industries | 6.5 | 220.39 |
| Cotton Jersey | 5118 | Knit | Lorber Industries | 8.2 | 277.9 |
| Cotton Sheeting | | Plain Weave | Cranston Mills | 7.0 | 237.2 |
| .16 mm Silk Charmeuse | 12104 | Satin | U.S. Silk, Inc. | 2.0 | 67.8 |
| Silk crepe dechine .18 mm | 14654 | Crepe | U.S. Silk, Inc. | 2.3 | 78.0 |
| Polyester Georgette | NOFU7-6058A | Crepe Georgette | Scher Fabrics, Inc. | 3.8 | 128.8 |
| Polyester stretch crepe | | Knit | Scher Fabrics, Inc. | 3.2 | 108.5 |

TABLE 2-continued

| FABRIC | STYLE | CONSTRUCTION | SOURCE | BASIS WEIGHT (OZ/YD$^2$) | BASIS WEIGHT SI UNITS (G/M$^2$) |
|---|---|---|---|---|---|
| Poly./lycra Blend | 55153 | Knit | Guilford Mills | 5.5 | 186.4 |
| Nylon/lycra blend | 56062 | Knit | Guilford Mills | 4.0 | 135.6 |
| Rayon | YWSR 1352 | Crepe | U.S. Silk, Inc. | 3.5 | 118.6 |

U.S. Silk, Inc. is located in New York, N.Y. Guilford Mills is located in New York, N.Y. Scher Fabrics, Inc. is located in New York, N.Y. Cranston Mills is located in Cranston, R.I. Lorber Industries is located in Gardena, Calif. Fisher Textiles is located in Indian Trail, N.C.

Running Conditions for Example B

Printing Steps

In each of the following trials for Example B, treated textile samples, prepared in accordance with the method previously described, were printed using an Encad Pro E (@ 300dpi) ink jet printer obtained from Encad Inc. of San Diego, Calif. Encad GA, GS, or GO inks were employed using 4-Pass Enhanced Print Mode, that is, with the printer passing over the textile substrate four times. In some instances, as noted as "double strike", in the data tables which follow, the printing head was preheated and the option identified as number 7 was selected on the printer. This option enabled more ink to be expelled from the printer onto the substrates. Dyes in the inks consisted of reactive, acid, and/or direct dyes and are described in the following Table 3.

TABLE 3

Inks of Example B Trials

| GS Ink Color | Order # | Dyes |
|---|---|---|
| Cyan | 209489 | Direct |
| Magenta | 208163-2 | Acid Reactive |
| Yellow | 208163-3 | Acid |
| Black | 208163-4 | Direct |

| GO Ink Color | Order # |
|---|---|
| Cyan | 208165-1 |
| Magenta | 208165-2 |
| Yellow | 208165-3 |
| Black | 208165-4 |

| GA Ink Color | Order # | Dyes |
|---|---|---|
| Cyan | 209491 | Direct |
| Magenta | 209490 | Acid |
| Yellow | 208164-3 | Acid |
| Black | 208164-4 | Direct |

Sample sizes were typically 11 by 15 inches. Additionally, a floral three-color print, using lavender, green and magenta was used for testing, of approximately 14 by 25 inches in size. Where it was difficult to distinguish between shades of green, a neutral portion (that is free of ink) of the sample was also evaluated.

Color Measurements

Conventional L*a*b* color values under CIE 1976 (Commission Internationale de l'Eclairage), and optical density measurements were made of the printed textile substrates using an X-Rite 938 Spectrodensitometer (illuminant D65/observer 10°), using CMY filters. The spectrodensitometer was operated in accordance with the manufacturer's operating manual. The X-Rite spectrodensitometer was obtained from the X-Rite Corporation of Grandville, Michigan. Average optical densities were taken as the sum of the average of three measurements using each filter. Delta E was calculated in accordance with the following equation:

$$\Delta E = \mathrm{SQRT}[(L^*\mathrm{standard} - L^*\mathrm{sample})^2 + (a^*\mathrm{standard} - a^*\mathrm{sample})^2 + (b^*\mathrm{standard} - b^*\mathrm{sample})^2]$$

The testing was in accordance with ASTM DM 2244-93 and ASTM E308-90. The higher the Delta E, the greater the change in color intensity. Unless the color's intensity is increased by a curing step, such as steaming, a large increase in delta E would typically be indicative of fading. L*a*b* testing was run 24 hours following printing of the samples. Where values for delta E are less than 3.0, it is generally accepted that such color change cannot be observed with the human eye. A detailed description of spectrodensitometer testing is available in the Technical Manual of the American Association of Textile Chemists and Colorists, Volume 74, 1999, by AATCC (American Association of Textile Chemists & Colorists).

Washing Method for Textile Samples

When indicated, textile samples were washed using the following method. Samples were placed in an appropriate size beaker or container such as a one liter beaker. Samples were then placed under cold running water (between approximately 10–20° C. for approximately two minutes. The cold water was then drained from the textile samples. The beakers were then refilled with hot water (between approximately 40–50° C.), and one ounce of detergent (Synthrapol® per gallon of water was added to the beakers). The textile samples were then washed out for approximately five minutes and then rinsed and drained of remaining water. Finally, the textile samples were rinsed with warm water (of between approximately 25–30° C.) for two minutes followed by a rinse with cold water (of between approximately 10–20° C.) for approximately one more minute.

Typically, although not necessarily required for curing, a second set of samples were printed and subsequently steamed (for approximately 25 minutes) using a laboratory steamer for comparison. For the purposes of the trials in Example B, if a colorfastness level is characterized as poor, observable bleeding or wicking has occurred. If a washfastness level has been characterized as poor, the image has washed out. If a colorfastness and washfastness level has been characterized as good, the color vibrancy and image retention is noticeably better than the poor level. If the colorfastness and washfastness levels are characterized as excellent, the color properties and vibrancy are the highest levels with the highest color density.

Example B

It should be noted that for each of the following trials in Example B, the textile substrate had been treated with the described treatment formulation using the previously described padding method and laminated to an adhesive coated paper backing which was obtained from American Biltrite, Inc. of Moorestown, N.J. under the designation ProtecRite® 6798, prior to printing to enable the substrate to be easily coursed through the printer. The substrates were then removed from the backing prior to washing. Adhesive coated backing papers identified by the designation 6798 include a paper having a nominal thickness of 5.4 ml, an initial adhesion value of 27 oz/in, a tensile strength of 16 lbs/in, and an elongation capability of 10%. The batch formulations utilized are described in the following trial summaries.

Trial 1. Cationic copolymer CP 7091 RV (ECC International), poly(diallyldimethylammonium chloride-co-diacetone acrylamide), was obtained in a 49.3% stock solution in water. 20.3 wet parts of this solution (10 dry parts, or approximately 90–91% of the total dry parts) were added to 70.3 parts water with mixing. 1.1 wet part (1 dry part, or approximately 9% of the total dry parts) Varisoft® 222 fabric softener (90% in water) was added and the entire solution was mixed until homogeneous. This formulation was used to treat 100% cotton poplin via a padding application and dried as previously described. A portion of this sample was laminated to an adhesive paper carrier, printed with an ink jet printer and dried under ambient conditions. The properties of the sample were evaluated for quality of the printed image, ink retention, and color density or saturation under the following conditions: 1) immediately after printing, 2) after printing and washing, 3) after printing and steaming, 4) after printing, steaming and washing. The printed samples exhibited superior image quality with little or no bleed, excellent ink retention, and excellent color density. Samples that were steamed exhibited excellent enhancement of color and appearance. Washfastness of steamed samples and samples not post-treated with steam exhibited moderate retention of color when washed. This trial utilized the GS ink set.

Trial 2. The formulation employed in trial 1 was used to treat a 100% polyester georgette fabric. Results for this fabric were similar to those obtained in trial 1. This trial utilized the GS ink set and GO ink set.

Trial 3. 20.3 wet parts (cationic copolymer CP 7091 RV (ECC International) (49.3% in water)(10 dry parts or approximately 90–91% of the total dry parts) was added to 48.9 parts water with mixing. 22.5 wet parts Adogen® 432 fabric softener (4.4% in water)(1 dry part, or approximately 9% of the total dry parts) was added and the entire solution was mixed until homogeneous. This formulation was used to treat 100% cotton poplin via a conventional padding application and dried. The sample was printed and evaluated using the process described in trial 1. The printed sample exhibited superior image quality with little or no bleed, excellent ink retention, and excellent color density. Samples that were steamed exhibited excellent enhancement for color and appearance. Washfastness of steamed samples and samples not post-treated with steam exhibited moderate retention of color when washed. This trial utilized the GS ink set.

Trial 4. The formulation employed in trial 3 was used to treat a 100% silk charmeuse fabric. Results for this fabric were similar to those obtained in trial 3. This trial utilized the GS ink set.

Trial 5. The formulation employed in trial 3 was used to treat a 100% silk crepe de chine fabric. Results for this fabric were similar to those obtained in trial 3. This trial utilized the GS ink set.

Trial 6. 20.3 wet parts cationic copolymer CP 7091 RV (ECC International) (49.3% in water) was added to 48.9 parts water with mixing. 11.3 wet parts Adogen® 432 fabric softener (4.4% in water) and 11.3 wet part Varisoft® 222 (4.7% in water) was added and the entire solution was mixed until homogeneous. This formulation was used to treat 100% cotton poplin via a conventional padding application and dried. The sample was printed and evaluated using the process described in trial 1. The printed sample exhibited superior image quality with little or no bleed, excellent ink retention, and excellent color density. Samples that were steamed exhibited excellent enhancement for color and appearance. Washfastness of steamed samples and samples not post-treated with steam exhibited moderate retention of color when washed. This trial utilized the GS ink set.

Trial 7. A treatment composition was formulated as in trial 6, substituting 23.1 wet parts Accosoft® 550 fabric softener (4.3% in water) (1 dry part, or approximately 9% of the total dry parts) for parts Adogen® 432 fabric softener. The cationic polymer made up 10 dry parts or approximately 90–91% of the total dry parts. The wet parts of water constituted approximately 48.2 parts. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were steamed exhibited excellent enhancement for color and appearance. Permanence of color to washing of steamed was dramatically increased compared to untreated samples. Some enhancement of colorfastness was achieved without steaming. This trial utilized the GS ink set.

Trial 8. The formulation employed in trial 7 was used to treat 85/15 nylon/lycra blend fabric. Results for this fabric were similar to those obtained in trial 7. This trial utilized the GS ink set.

Trial 9. The formulation employed in trial 7 was used to treat a 100% silk charmeuse fabric. Results for this fabric were similar to those obtained in trial 7. This trial utilized the GS ink set.

Trial 10. A treatment composition was formulated as in trial 3, substituting 22.7 wet parts Alubrasoft® Super 100 fabric softener (4.4% in water)(1 dry part or approximately 9% of the total dry parts) for parts Adogen® 432 fabric softener. The formulation included 20.3 wet parts of 7091 RV (10 dry parts, or approximately 90–91% of the total dry parts), and 48.7 parts water. This formulation was used to treat (cotton poplin) via a conventional padding application and dried. The sample was printed and evaluated using the process described in trial 1. The printed sample exhibited superior image quality with little or no bleed, excellent ink retention, and excellent color density. Samples that were steamed exhibited excellent enhancement for color and appearance. Permanence of color to washing of steamed samples was dramatically increased compared to untreated samples. Some enhancement of colorfastness was achieved without steaming. The trial utilized the GS ink set.

Trial 11. The formulation employed in Example 10 was used to treat 85/15 nylon/lycra blend fabric. Results for this fabric were similar to those obtained in trial 10. The trial utilized the GS ink set.

Trial 12. The formulation employed in trial 10 was used to treat a 100% silk charmeuse fabric. Results for this fabric were similar to those obtained in trial 10. The trial utilized the GS ink set.

Trial 13. A treatment composition was formulated as in trial 3, substituting 8.8 wet parts Ahcovel® fabric softener (11.3% in water)(1 dry part, or approximately 9% of the total dry parts) for parts Adogen® 432 fabric softener. The formulation included 20.3 wet parts of 7091RV (10 dry parts, or approximately 90–91% of the total dry parts), and 62.5 parts water. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were steamed exhibited excellent enhancement for color and appearance. Permanence of color to washing of steamed samples was dramatically increased compared to untreated samples. Good enhancement of colorfastness was achieved without steaming. The trial utilized the GS ink set.

Trial 14. Cationic polymer CP 261LV (ECC International), Poly(diallyldimethylammonium), was obtained in a 43.0% stock solution in water. 23.3 wet parts of this solution (10 dry parts, or approximately 90–91% of the total dry parts) was added to 47.1 parts water with mixing. 21.3 wet parts Varisoft® 222 fabric softener (4.7% in water)(1 dry part, or approximately 9% of the total dry parts) was added and the entire solution was mixed until homogeneous. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were not steamed exhibited moderate retention of color when washed. Some enhancement of colorfastness was achieved. Samples that were steamed exhibited excellent enhancement for color and appearance. Washfastness of steamed samples and samples not post-treated with steam exhibited moderate retention of color when washed. The trial utilized the GS ink set.

Trial 15. 28.8 wet parts of a solution containing 80% ethoxylated polyethylenimine (34.7% in water)(10 dry parts, or approximately 90–91% of the total dry parts) was combined with 41.6 parts water with mixing. 21.3 wet parts Varisoft® 222 fabric softener (4.7% in water) (1 dry part, or approximately 9% of the total dry parts) were added and the entire solution was mixed until homogeneous. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were not steamed exhibited moderate retention of color when washed. Some enhancement of colorfastness was achieved. Samples that were steamed exhibited excellent enhancement for color and appearance. Washfastness of steamed samples and samples not post-treated with steam exhibited moderate retention of color when washed. The trial utilized the GS ink set.

Trial 16. 50.7 wet parts cationic copolymer CP 7091 RV (ECC International) (49.3% in water)(25 dry parts, or approximately 18–19% of the total dry parts) was added to 656 parts water with mixing. 90.6 wet parts Airflex® 540 latex emulsion (ethylene-vinyl acetate copolymer, 55.2% in water)(50 dry parts, or approximately 37% of the total dry parts) of AirProducts and Chemicals Inc. of Allentown, Pa., 114.9 wet parts PrintRite® 595 acrylic emulsion (BF Goodrich, 43.5% in water)(50 dry parts, or approximately 37% of the total dry parts), and 212.8 wet parts Varisoft® 222 fabric softener (4.7% in water)(10 dry parts, or approximately 7% of the total dry parts) were added and the entire solution was mixed until homogeneous. This formulation was used to treat 100% Cotton Poplin via a padding application and dried. The sample was printed and evaluated using the process described in trial 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The trial utilized the GS ink set.

Trial 17. The formulation employed in trial 16 was used to treat a 100% cotton Jersey knit fabric. Results for this fabric were similar to those obtained in trial 16. The trial utilized the GS ink set.

Trial 18. The formulation employed in trial 16 was used to treat an 85/15 nylon/lycra blend fabric. Results for this fabric were similar to those obtained in trial 16. The trial utilized the GS ink set.

Trial 19. The formulation employed in trial 16 was used to a 100% silk charmeuse fabric. Results for this fabric were similar to those obtained in trial 16. The trial utilized the GS ink set.

Trial 20. The formulation employed in trial 16 was used to a 100% silk crepe de chine fabric. Results for this fabric were similar to those obtained in trial 16. The trial utilized the GS ink set.

Trial 21. 50.7 wet parts cationic copolymer CP 7091 RV (ECC Intentional) (49.3% in water)(25 dry parts, or approximately 18–19% of the total dry parts) was added to 656.0 parts water with mixing. 90.6 wet parts Airflex® 540 latex emulsion (ethylene-vinyl acetate copolymer, 55.2% in water)(50 dry parts, or approximately 37% of the total dry parts), 114.9 wet parts PrintRite® 591 acrylic emulsion (BF Goodrich, 43.5% in water)(50 dry parts, or approximately 37% of the total dry parts), and 212.8 wet parts Varisoft® 222 fabric softener (4.7% in water) (10 dry parts, or approximately 7% of the total dry parts) were added and the entire solution was mixed until homogeneous. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. Little measurable washout was detected. The trial utilized the GS ink set.

Trial 22. The formulation employed in trial 21 was used to treat a 100% cotton Jersey Knit fabric. Results for this fabric were similar to those obtained in trial 21. The trial utilized the GS ink set.

A Sample result for delta E values is reflected in the following Table 4. It should be recognized that values for delta E can range from 0 to 100 with the lower values being preferred for demonstrating minimum loss of color vibrancy/fading. Delta E values are a comparison of "treated and washed" or "treated and dry cleaned" samples versus "treated" samples. In some instances, Delta E values are a comparison of "treated, steamed, and washed" samples, versus "treated" samples. Textile fabrics which were capable of being printed without a coating experienced poor printing attributes and experienced total washout (with a delta E theoretically at approximately 100). The following data applies to a Cranston Cotton sample, which was treated with a coating formulation as described in Trial 21.

TABLE 4

| TREATED | L* | A* | B* | DELTA E |
|---|---|---|---|---|
| Magenta Treated & Washed | 58.0 | 30.8 | −17.6 | standard |
| Magenta | 59.0 | 37.2 | −22.9 | 8.3 |

Trial 23. The formulation employed in trial 21 was used to treat a 100% silk charmeuse fabric. Results for this fabric were similar to those obtained in trial 21. This substrate was cleaned using commercial dry cleaning facilities and sample results are reflected in the following Table 5. The trial utilized the GS ink set.

TABLE 5

| TREATED | L* | A* | B* | DELTA E |
|---|---|---|---|---|
| Magenta | 46.9 | 54.8 | −5.2 | standard |
| Black 1 | 29.5 | 1.8 | 0.5 | standard |
| Yellow | 83.6 | 5.0 | 91.8 | standard |
| Cyan | 61.8 | −27.9 | −31.2 | standard |
| Dry Cleaned | | | | |
| Magenta | 44.7 | 54.6 | −5.0 | 2.3 |
| Black 1 | 27.7 | 1.4 | −.03 | 2.0 |
| Yellow | 82.4 | 4.7 | 90.3 | 1.9 |
| Cyan | 60.8 | −28.5 | 29.8 | 1.8 |

Trial 24. 10.1 wet parts cationic copolymer CP 7091 RV (ECC International) (49.3% in water)(5 dry parts, or approximately 45% of the total dry parts) was added to 48.8 parts water with mixing. 11.5 wet parts PrintRite® 591 acrylic emulsion (BF Goodrich, 43.5% in water)(5 dry parts, or approximately 45% of the total dry parts), and 21.3 wet parts Varisoft® 222 fabric softener (4.7% in water) (1 dry part, or approximately 9% of the total dry parts) were added and the entire solution was mixed until homogeneous. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were not steamed exhibited good retention of color when washed. Samples that were steamed exhibited excellent enhancement for color and appearance. Washfastness of steamed samples and samples not post-treated with steam exhibited moderate retention of color when washed. The trial utilized the GS ink set.

Trial 25. The formulation employed in trial 24 was used to treat an 85/15 nylon/lycra blend fabric. Results for this fabric were similar to those obtained in trial 24. The trial utilized the GS ink set.

Trial 26. 10.1 wet parts cationic copolymer CP 7091 RV (ECC International) (49.3% in water) (5 dry parts, or approximately 45% of the total dry parts) was added to 48.8 parts water with mixing. 11.5 wet parts PrintRite® 595 acrylic emulsion (BF Goodrich, 43.5% in water)(5 dry parts, or approximately 45% of the total dry parts), and 21.3 wet parts Varisoft® 222 fabric softener (4.7% in water)(1 dry part, or approximately 9% of the total dry parts) were added, and the entire solution was mixed until homogeneous. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The trial utilized the GS ink set.

Trial 27. The formulation employed in trial 26 was used to treat an 85/15 nylon/lycra blend fabric. The printed sample exhibited superior image quality with little or no bleed, excellent ink retention, and excellent color density. Permanence of color to washing was not improved in these samples. The trial utilized the GS ink set.

Trial 28. 10.1 wet parts cationic copolymer CP 7091 RV (ECC International) (49.3% in water)(5 dry parts, or approximately 45% of the total dry parts) was added to 51.2 parts water with mixing. 9.1 wet parts Airflex® 540 latex emulsion (ethylene-vinyl acetate copolymer, 55.2% in water)(5 dry parts, or approximately 45% of the total dry parts), and 21.3 wet parts Varisoft® 222 fabric softener (4.7% in water)(1 dry part, or approximately 9% of the total dry parts) were added and the entire solution was mixed until homogeneous. This formulation was used to treat 100% cotton poplin via a padding application and dried. The sample was printed and evaluated using the process described in trial 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The trial utilized the GS ink set.

Trial 29. The formulation employed in trial 28 was used to treat an 85/15 nylon/lycra blend fabric. The printed sample exhibited superior image quality with little or no bleed, excellent ink retention, and excellent color density. Permanence of color to washing was not improved in these samples. The trial utilized the GS ink set.

Trial 30. 50.7 wet parts cationic copolymer CP 7091 RV (ECC International) (49.3% in water)(25 dry parts, or approximately 18–19% of the total dry parts) was added to 881.9 parts water with mixing. 181.3 wet parts Airflex® 540 latex emulsion (ethylene-vinyl acetate copolymer, 55.2% in water)(100 dry parts, or approximately 74% of the total dry parts), and 11.1 wet parts Varisoft® 222 fabric softener (90% in water)(10 dry parts, or approximately 7% of the total dry parts) were added and the entire solution was mixed until homogeneous. This formulation was used to treat a 250 denier polyester/coffon banner fabric via a padding application and dried. The sample was printed as described in trial 1. The printed samples exhibited superior image quality with little or no bleed, excellent ink retention, and excellent color density. Permanence of color to washing was dramatically increased without steaming or other steps.

Trial 31. 50.7 wet parts cationic copolymer CP 7091 RV (ECC International) (49.3% in water) (25 dry parts, or approximately 18–19% of the total dry parts) was added to 878.0 parts water with mixing. 181.3 wet parts Airflex® 540 latex emulsion (ethylene-vinyl acetate copolymer, 55.2% in water)(100 dry parts, or approximately 74% of the total dry parts), and 15.0 wet parts Adogen® 432 fabric softener (66.7% in water)(10 dry parts, or approximately 7% of the total dry parts) were added and the entire solution was mixed until homogeneous. This formulation was used to treat a 250 denier polyester/cotton banner fabric via a padding application and dried. The sample was printed as described in trial 1. The printed samples exhibited superior image quality with little or no bleed, excellent ink retention, and excellent color density. Permanence of color to washing was dramatically increased without steaming or other steps.

Textile samples in Examples 30 through 35 were printed with the Encad GO ink set obtained from the Encad Inc.

Trial 32. The formulation employed in trial 31 was used to treat a polyester poplin fabric. The printed sample exhibited superior image quality with little or no bleed, excellent ink retention, and excellent color density. Permanence of color to washing was dramatically increased without steaming or other curing steps.

Trial 33. The formulation employed in trial 31 was used to treat a polyester satin fabric. The printed sample exhibited superior image quality with little or no bleed, excellent ink retention, and excellent color density. Permanence of color to washing was dramatically increased without steaming or other curing steps. In addition, the sample possessed excellent visual color reflectivity. Such quality may be observed visually or measured through diffuse reflectance methods.

Trial 34. The formulation employed in trial 31 was used to treat a polyester poplin fabric. The printed sample exhibited superior image quality with little or no bleed, excellent ink retention, and excellent color density. Permanence of color to washing was dramatically increased without steaming or other steps.

Trial 35. The formulation employed in trial 31 was used to treat a polyester satin fabric. The printed sample exhibited superior image quality with little or no bleed, excellent ink retention, and excellent color density. Permanence of color to washing was dramatically increased without steaming or other steps. In addition, sample possessed excellent color reflectivity.

Trial 36. 50.7 wet parts cationic copolymer CP 7091 RV (ECC International) (49.3% in water)(25 dry parts, or approximately 17% of the total dry parts) was added to 993.5 parts water with mixing. 230.9 wet parts PrintRite® 591 acrylic emulsion (BF Goodrich, 43.3% in water)(100 dry parts, or approximately 68–69% of the total dry parts), and 296.3 wet parts Varisoft® 475 fabric softener (6.8% in water) (20 dry parts, or approximately 13–14% of the total dry parts) were added and the entire solution was mixed until homogeneous. This formulation was used to treat 100% silk charmeuse via a padding application and dried. Wet pick-up was 140%. The sample was printed and evaluated using the process described in trial 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The trial utilized the GS ink set.

Results of Trials 30–36

The printed images on the textile samples from examples 29–35 were waterfast and exhibited acceptable lighffastness for outdoor stability in accordance with ASTM test method G26 when printed with Encad GO inks. ASTM test method G26 included the following steps:

The standard practice under ASTM G26 for operating a light-exposure (xenon-arc type) with and without water for exposure of nonmetallic materials consists of the following procedures. Test method 1 was employed for continuous exposure to light and intermittent exposure to water spray. The type of apparatus used consisted of an Atlas Ci 5000 apparatus. The instrument was programmed for continuous light and intermittent water spray in accordance with the manufacturer's instructions. The conventional cycle of 102 minutes of light exposure followed by a cycle of 18 minutes of light and water spray was employed. Such sample data measurements are reflected in the following Table 6. The method of print mode is double strike, at 102 light, 18 min. spray after 6 hours.

TABLE 6

| FIRE RETARDANT POLY. POPLIN | L* | A* | B* | DELTA E |
|---|---|---|---|---|
| Black 1 | 29.0 | 1.7 | −3.3 | 1.5 |
| Cyan | 60.6 | −22.1 | −38.5 | 4.2 |
| Yellow | 89.7 | −9.0 | 64.4 | 14.5 |
| Magenta | 52.3 | 49.1 | −10.0 | 2.6 |

In order to determine the bond strength of the laminate materials produced, peel strength was measured for laminates produced in accordance with the inventive method, by using a Chatillon LTCM-6 benchtop compression and bond tester apparatus, made by Chatillon of Greensboro, N.C. In this regard, samples of the material to be tested are cut in 2 by 6 inch swatches in both the machine and cross machine directions.

Sample layers are peeled apart (≈0.5 inch) with each layer being placed in opposing mounting plates. Speed on the apparatus is set to 12 inches/minute, and the grams force of delamination is recorded. The peel strength testing for textiles measures the grams force of delaminating the fabric from the adhesive paper. Peel adhesion/delamination is traditionally measured in machine direction, that is the direction of the material in which it is produced. All of the tolerances are under average temperature conditions of 24.0° C. and 31–% 71.2% relative humidity. Different fabric types are laminated to a variety of adhesive coated papers, resulting in a range of peel strength values. It should be noted that experience has shown, especially on woven fabrics, that cross-direction test strips expose fewer frayed threads that can separate from the woven fabric, stick to the adhesive and cause a false (higher) peel value by increasing the force as the test is being conducted as the frayed threads are being pulled out of the woven structure.

Peel strength values for the various textile fabric substrates are shown in the following Table 7.

TABLE 7

Peel Strength Data of Laminated Textiles

| FABRIC TYPE | STYLE | OPTIMUM VALUE (G/INCH) | TARGETED RANGE (+/−2 G/INCH) | OPTIMUM VALUE (G/CM) | TARGETED RANGE (+/−2 G/CM) |
|---|---|---|---|---|---|
| Polyester Poplin | PP6248 | 17.0 | 15.0–19.0 | 43.2 | 41.2–45.2 |
| Polyester Satin | PS241 | 12.5 | 10.5–14.5 | 31.8 | 29.8–33.8 |
| 250 Den. Dacron Poly. | 250 Dacron | 11.0 | 9.0–13.0 | 27.9 | 25.9–29.9 |
| Cotton Poplin | 9680 | 11.0 | 9.0–13.0 | 27.9 | 25.9–29.9 |

TABLE 7-continued

Peel Strength Data of Laminated Textiles

| FABRIC TYPE | STYLE | OPTI-MUM VALUE (G/INCH) | TARGETED RANGE (+/−2 G/INCH) | OPTI-MUM VALUE (G/CM) | TARGETED RANGE (+/−2 G/CM) |
|---|---|---|---|---|---|
| Cotton Jersey | 5118 | 11.0 | 9.0–13.0 | 27.9 | 25.9–29.9 |
| Cotton Sheeting | | 11.0 | 9.0–13.0 | 27.9 | 25.9–29.9 |
| Silk Charm. .16 mm | 12104 | 12.5 | 10.5–14.5 | 31.8 | 29.8–33.8 |
| Silk Crepe .18 mm | 14654 | 12.5 | 10.5–14.5 | 31.8 | 29.8–33.8 |
| Poly. Georgette | NOFU7-6058A | 20.0 | 18.0–22.0 | 50.8 | 48.8–52.8 |
| Poly Stretch Crepe | | 20.0 | 18.0–22.0 | 50.8 | 48.8–52.8 |
| Poly. Lycra Blend | 55153 | 11.0 | 9.0–13.0 | 27.9 | 25.9–29.9 |
| Nylon Lycra Blend | 56062 | 11.0 | 9.0–13.0 | 27.9 | 25.9–29.9 |
| Rayon | YWSR 1352 | 20.0 | 18.0–22.0 | 50.8 | 48.8–52.8 |

The desirable coatings by fabric type are as follows: Cotton Poplin and Jersey Knit use a coating described in trial 21 at 13% total solids; Silk Crepe de Chine and Charmeuse use a described in trial 36 at 7% total solids; Polyester Georgette use a coating described in trial 30 at 32% total solids; Poly Satin and Poly Dacron using the previous coating at 32% total solids, and Poly Poplin using the previous coating at between 20–25% total solids.

While the invention has been described in detail with particular reference to a preferred embodiment thereof, it should be understood that many modifications, additions, and deletions can be made thereto without departure from the spirit and the scope of the invention as set forth in the following claims.

What is claimed is:

1. A coating formulation containing solids, the formulation for treating textile substrates for ink jet printing and comprising:
   a) a cationic polymer selected from the group consisting of polymers or copolymers of diallyldialkylammonium monomers, acrylate and acrylamide monomers, acrylamidoethyldimethylammonium chloride monomers, and quaternized vinylpyridine,
   b) a fabric softener; and
   c) water.

2. A coating formulation of claim 1 wherein said cationic polymer is a poly(diallyldimethylammonium chloride-co-diacetone acrylamide).

3. The coating formulation of claim 1 wherein said fabric softener is present in the formulation in an amount between about 5 and about 20 weight percent of total solids.

4. The coating formulation of claim 3 wherein said fabric softener is either cationic or nonionic.

5. The coating formulation of claim 4 wherein said fabric softener is an alkylated ammonium compound.

6. The coating formulation of claim 1 further comprising a latex binder.

7. The coating formulation of claim 6 wherein said latex binder is present in the formulation in an amount between about 0 to about 80 weight percent of the total solids.

8. The coating formulation of claim 7 wherein said latex binder is either cationic or nonionic.

9. The coating formulation of claim 8 wherein said latex binder is selected from the group consisting of vynilacetate, ethylene-vinylacetate, acrylate, styrene and styrene-acrylate resins.

10. A coating formulation containing solids, the coating formulation for treating textile substrates for ink jet printing and comprising:
   a) a cationic polymer or copolymer selected from the group consisting of polymers or copolymers of diallyldialkylammonium monomers, acrylate and acrylamide monomers, acrylamidoethyldimethylammonium chloride monomers, and quaternized vinylpyridine, which is present in an amount between about 5 and about 95 weight percent of the total solids;
   b) a fabric softener, wherein said fabric softener is present in an amount between about 5 and about 20 weight percent of the total solids;
   c) a latex binder, wherein said latex binder is present in an amount between about 0 and about 80 weight percent of the total solids; and
   d) water,
wherein the total solids content of the formulation is between about 5 and about 50 weight percent.

11. The coating formulation of claim 10 wherein the total solids content of the formulation is between about 5 and about 32 weight percent.

12. The coating formulation of claim 11 wherein the total solids content of the formulation is between about 25 and about 28 weight percent.

13. The coating formulation of claim 1 wherein said cationic polymer or copolymer is present in an amount between about 5 and about 95 weight percent of the total solids.

14. The coating formulation of claim 1 wherein said cationic polymer or copolymer is a quaternary ammonium polymer.

* * * * *